United States Patent
Bolt et al.

(10) Patent No.: US 7,200,771 B2
(45) Date of Patent: Apr. 3, 2007

(54) RELOCATION BATCH PROCESSING FOR DISK DRIVES

(75) Inventors: David A. Bolt, Colorado Springs, CO (US); Brian Worby, Colorado Springs, CO (US)

(73) Assignee: Plasmon LMS, Inc., Colorado Springs, CO (US)

( * ) Notice: Subject to any disclaimer, the term of this patent is extended or adjusted under 35 U.S.C. 154(b) by 438 days.

(21) Appl. No.: 10/712,627

(22) Filed: Nov. 12, 2003

(65) Prior Publication Data

US 2004/0153743 A1    Aug. 5, 2004

Related U.S. Application Data

(60) Provisional application No. 60/426,721, filed on Nov. 15, 2002.

(51) Int. Cl.
*G06F 11/00* (2006.01)
(52) U.S. Cl. .............. 714/8; 714/710; 711/170
(58) Field of Classification Search .............. 714/8, 714/710, 170; 711/170; 369/53.17, 44.33, 369/47.14
See application file for complete search history.

(56) References Cited

U.S. PATENT DOCUMENTS

| | | | |
|---|---|---|---|
| 4,924,331 A | 5/1990 | Robinson et al. | |
| 5,404,357 A | 4/1995 | Ito et al. | |
| 5,974,544 A * | 10/1999 | Jeffries et al. | 713/1 |
| 6,025,966 A | 2/2000 | Nemazic et al. | |
| 6,034,831 A | 3/2000 | Dobbek et al. | |
| 6,052,804 A | 4/2000 | Thowe et al. | |
| 6,101,619 A | 8/2000 | Shin | |
| 6,189,110 B1 * | 2/2001 | Saitoh et al. | 714/8 |
| 6,212,647 B1 * | 4/2001 | Sims et al. | 714/8 |
| 6,263,459 B1 * | 7/2001 | Schibilla | 714/710 |
| 6,301,644 B1 | 10/2001 | Andoh et al. | |
| 6,338,153 B1 | 1/2002 | Sasaki et al. | |
| 6,341,109 B1 * | 1/2002 | Kayanuma | 369/47.14 |
| 6,377,524 B1 | 4/2002 | Ko | |
| 6,384,997 B1 * | 5/2002 | Wu et al. | 360/46 |
| 6,427,215 B2 | 7/2002 | Rafanello et al. | |

(Continued)

FOREIGN PATENT DOCUMENTS

JP    60226026 A    11/1985

(Continued)

OTHER PUBLICATIONS

*IBM Technical Disclosure Bulletin*, Aug. 1994, US, "Replacement Sector Caching for Optical Disk Drives".

*Primary Examiner*—Robert Beausoliel
*Assistant Examiner*—Christopher McCarthy
(74) *Attorney, Agent, or Firm*—Oppenheimer Wolff & Donnelly LLP

(57) ABSTRACT

A method is provided that minimizes the seek time necessary for relocating bad sectors found during data processing. During standard data processing in the prime disk area, identified bad sectors are saved in memory until after all of the data processing has been completed. The bad sectors are then relocated from memory in a batch process, thereby requiring only a single seek command to the defect management area. This procedure reduces the time penalty in the number of relocations to a near constant time and avoids a linear time penalty.

35 Claims, 4 Drawing Sheets

U.S. PATENT DOCUMENTS

| | | |
|---|---|---|
| 6,442,715 B1 | 8/2002 | Wilson |
| 6,728,899 B1 * | 4/2004 | Ng et al. .................. 714/8 |
| 6,771,575 B1 * | 8/2004 | Park et al. ............ 369/47.14 |
| 6,868,511 B2 * | 3/2005 | Ko ........................ 714/710 |
| 6,940,796 B2 * | 9/2005 | Ariyama ............... 369/53.17 |
| 7,016,275 B1 * | 3/2006 | Lee et al. ............. 369/47.14 |
| 7,047,438 B2 * | 5/2006 | Smith et al. .............. 714/8 |
| 7,050,369 B2 * | 5/2006 | Lee et al. ............. 369/47.14 |
| 2001/0042223 A1 * | 11/2001 | Hoskins ..................... 714/8 |
| 2002/0035704 A1 | 3/2002 | Wilson |

FOREIGN PATENT DOCUMENTS

| | | |
|---|---|---|
| JP | 5094672 A | 4/1993 |
| JP | 6208769 A | 7/1994 |
| JP | 6290547 A | 10/1994 |

\* cited by examiner

| Logical Sectors | Physical Sectors |
|---|---|
| 0 | 0 |
| 1 | 1 |
| 2 | 2 |
| 3 | 3 |
| (bad sector) | 4 |
| 4 | 5 |
| 5 | 6 |
| (bad sector) | 7 |
| 6 | 8 |
| 7 | 9 |
| ... | |
| 997 | 999 |

RELOCATION BATCH PROCESSING FOR DISK DRIVES

CROSS-REFERENCE TO RELATED APPLICATIONS

This application claims the benefit of U.S. Provisional Application No. 60/426,721, filed Nov. 15, 2002.

BACKGROUND OF THE INVENTION

One of the tasks a computer performs when a disk is being formatted is detecting bad sectors on the disk and relocating them to minimize their interference with performance. Such relocations are known as primary or static relocations and are effected by a relocation algorithm called a slipping algorithm. Bad sectors and debris may also be discovered after formatting is complete, causing the sectors to be relocated after the disk is in service. These relocations are called secondary or dynamic relocations. Secondary relocations are typically performed using an algorithm called a replacement algorithm.

Error information regarding bad sectors encountered during formatting and during subsequent disk usage are typically stored in a specified area on the disk, sometimes called the primary defect list (PDL) and the secondary defect list (SDL) respectively. This information indicates which sectors should not be used to store data, and will cause processing commands (e.g., read, write, verify) to either skip the bad sectors or search other specified physical locations on the disk for those sectors.

Whereas slipping algorithms have a minimal effect on drive performance, replacement algorithms adversely affect the performance of a disk drive, both during the write process and subsequently during the read process. Dynamic relocations are time consuming due to the excessive seek time they require. During a normal write process, the drive accesses process sectors in the prime or standard user area of the disk. When a bad sector is encountered in the standard user area, the drive seeks to a dedicated defect management area (DMA) and sets up a relocated sector for the data that was to be placed in the bad sector. The DMA is physically separated from the standard user area. Whenever the bad sector is referenced, the drive is then translated to the appropriate DMA where the relocated sector lies. After the data in the relocated sector has been processed, the drive seeks back to the standard user area and continues.

The process of seeking to the DMA, processing the relocation, and then seeking back to the standard user area is repeated every time a relocation is needed. Thus, a seek-process-seek delay is encountered every time a relocated sector needs to be accessed. This time penalty grows linearly with the number of defective sectors in an extent.

Prior efforts at reducing this time penalty have included providing multiple DMA areas on the disk. The computer selects the DMA area closest to the bad sector whenever a relocation must be performed. This method reduces the constant associated with the linear time penalty because the seek step takes less time. However, the linear nature of the time penalty has not been altered.

The transfer rate of disk drives is severely degraded by relocations due to the linear time penalty associated with the typical defect management process. As data densities increase, the effect of debris and reduction in margins will increase the number of relocations for disk drive systems.

There is a need for a process that reduces the time required to conduct a post-formatting relocation. There is also a need for a process that allows the seek steps of several relocations to be combined, thereby encouraging batch relocations.

BRIEF SUMMARY OF THE INVENTION

The present invention generally pertains to a process for efficiently performing multiple post-formatting relocations of bad disk sectors by allowing multiple relocations to be performed simultaneously. The amount of debris or other physical flaws present on removable media such as disk 50 typically increases over time. Further, unlike defective sectors that are identified during formatting, these post-formatting defects are not managed using the sector slipping algorithm, and it is time consuming to address such flaws. The time required for managing these secondary/dynamic relocations are minimized in accordance with the present invention.

The process of the present invention involves processing (writing, reading, verifying, etc.) the data in the prime area of the disk. As bad sectors are encountered during the processing, the relocations are saved collectively in memory for later processing. The data processing continues in this manner until completion is achieved. Upon completion of the data processing in the prime area, a single seek step is used to access a designated DMA. All of the relocations are then processed in the DMA.

Accordingly, the present invention provides for completing all of the prime disk area processing first and only then batch processing the secondary relocations. This process avoids implementing a lengthy linear replacement algorithm to address the post-formatting defects, which would otherwise call multiple seek operations for each defective sector identified on disk 50. The approach of the present invention reduces the linear time penalty in the number of relocations to a near constant time.

BRIEF DESCRIPTION OF THE DRAWINGS

FIG. 2 is a diagram showing the mapping of logical sectors to physical sectors;

DETAILED DESCRIPTION OF THE INVENTION

Figure 1:
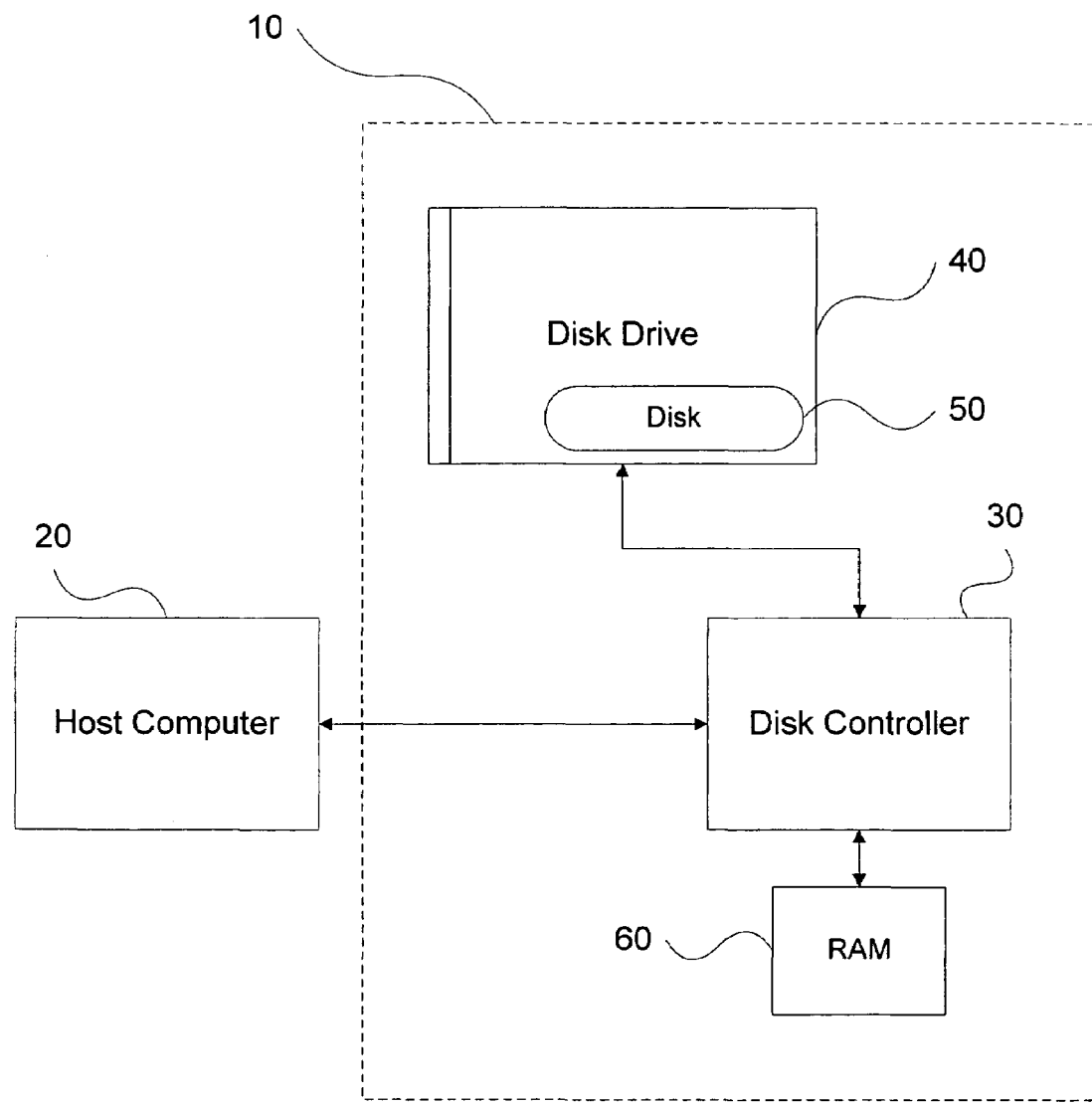
FIG. 1 is a diagram of a data storage system in accordance with the present invention.

Referring now to FIG. 1, there is shown a data storage system 10 including a disk controller 30 and a disk drive 40. Disk controller 30 receives data requests from a host computer 20, which causes disk controller 30 to communicate with disk drive 40. Data storage system 10 further includes a random access memory (RAM) 60, which is in communication with disk controller 30. Disk drive 40 houses a disk 50, such as a magnetic or optical disk or other removable media, and reads data from and writes data to the disk. Disk drive 40 also includes a number of control systems and components which are obviously not shown in FIG. 1. Disk 50 includes numerous sectors (not shown) for storing data, which are the smallest units that can be accessed on a disk.

Disk 50 may contain one or more bad sectors, which is a sector that cannot be used due to a physical flaw. Disk drive 40 and disk controller 30 operate to control disk drive 40 for accomplishing the various tasks that are performed on the disk 50 as described herein.

During disk formatting, in accordance with the present invention, the primary relocation, also known as static relocation, erases the data in the sectors of disk 50 and checks the surface of disk 50 for any defective sectors. When bad sectors are identified, their physical locations are stored by data storage system 10 in RAM 60, and the physical/logical sector relationship is mapped out using a sector slipping algorithm. When disk 50 is new and the formatting process identifies bad sectors, such sectors are typically truly defective and are therefore unusable for the life of the disk. A sector slipping algorithm provides for a relatively fast means of identifying and managing bad sectors and debris found during formatting, thereby minimizing the disk access time required by disk drive 40 to format disk 50.

FIG. 2 shows an example of the relationship between the logical sectors and physical sectors of disk 50, where the disk has 1000 physical sectors, sectors 0–999. If during the process of formatting disk 50 it is determined by the data storage system 10 that physical sectors 4 and 7 of disk 50 are defective, the primary/static replacement procedure maps the logical sectors accordingly. As shown in FIG. 2, physical sectors 4 and 7 have no logical sectors mapped thereto; the mapping of the logical sectors proceeds sequentially but passes over physical sectors 4 and 7, which causes those sectors to be skipped during disk usage. The disk then has only 998 physical sectors available for subsequent processing after formatting.

As indicated, the data storage system uses a sector slipping algorithm during formatting, which causes disk drive 40 to merely skip over defective sectors when there is an attempt to access them. Thus, the time associated with the formatting process is minimized due to the short period needed to skip a disk sector, which is typically the time necessary to read a sector.

Figure 3A:
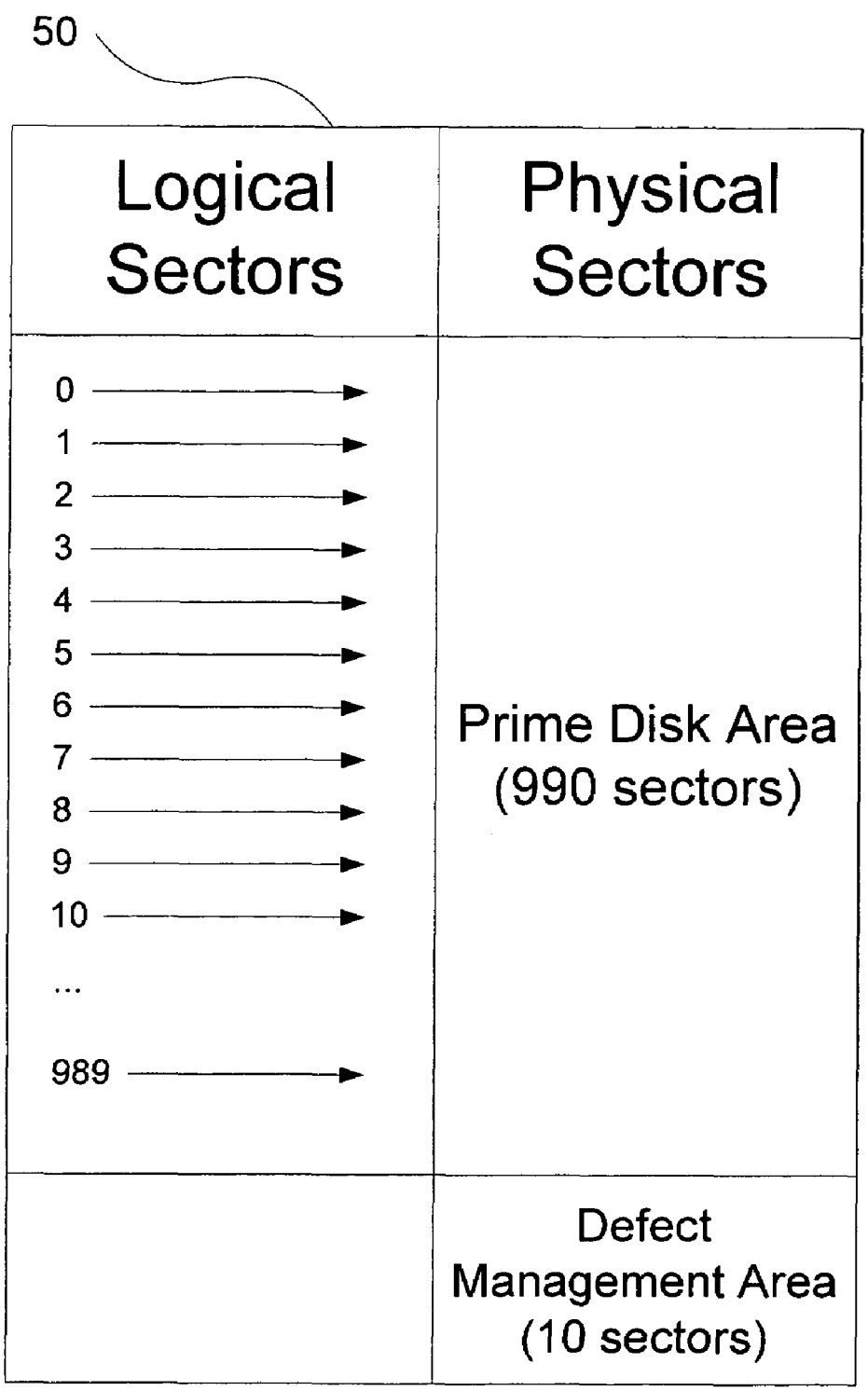
FIG. 3a is a diagram illustrating the disk layout after formatting but before defective sector relocations have been processed.

Once disk 50 has been formatted, the disk is available for standard processing in the prime disk area. Standard processing typically includes activities such as writing to the disk, reading from the disk, or verifying data on the disk. When defective sectors and debris are encountered during the standard processing, secondary sector relocations are implemented. Secondary sector relocations adjust logical sectors that are mapped to defective physical sectors in a Prime Disk Area (PDA) of disk 50 and maps them to good physical sectors in a defect management area (DMA) of disk 50. FIG. 3a illustrates the PDA and the DMA of disk 50.

FIG. 3a shows a post-formatted disk 50 in accordance with the present invention, where the disk has 1000 physical sectors and none of the physical sectors have yet been determined to be defective. FIG. 3a further illustrates the relationship between logical sectors and physical sectors; the PDA has 990 physical sectors, which are currently mapped to by logical sectors 0–989, and the DMA has 10 physical sectors, which are not yet mapped. The ten physical sectors in the DMA are reserved for subsequent mapping when defects are encountered.

In operation, all standard data processing (e.g., reads, writes, verifies) in the PDA of disk 50 is performed first without processing any relocations in the DMA of disk 50. Accordingly, during the standard data processing, disk drive 40 does not access the DMA, even if defects are encountered. Rather, as defective sectors are encountered by disk drive 40 during the initial standard data processing, information regarding those sectors is simultaneously stored in RAM 60 for subsequent processing. Because disk drive 40 does not access the DMA of disk 50 for each defective sector encountered, the access times involved with this first step are comparable to the initial formatting, which is typically the same time necessary to read/write/verify a sector, depending on the operation being performed.

Next, once the initial standard data processing of the prime disk area is complete, all secondary relocations are batch processed. In order to perform the secondary relocations, disk drive 40 executes only a single seek-process, which seeks to the DMA of disk 50, and then performs the necessary relocation batch processing for multiple defective sectors. The batch processing is accomplished by disk drive 40 accessing RAM 60, retrieving the necessary defective sector information stored therein, and then executing the relocations based on that information.

Figure 3B:
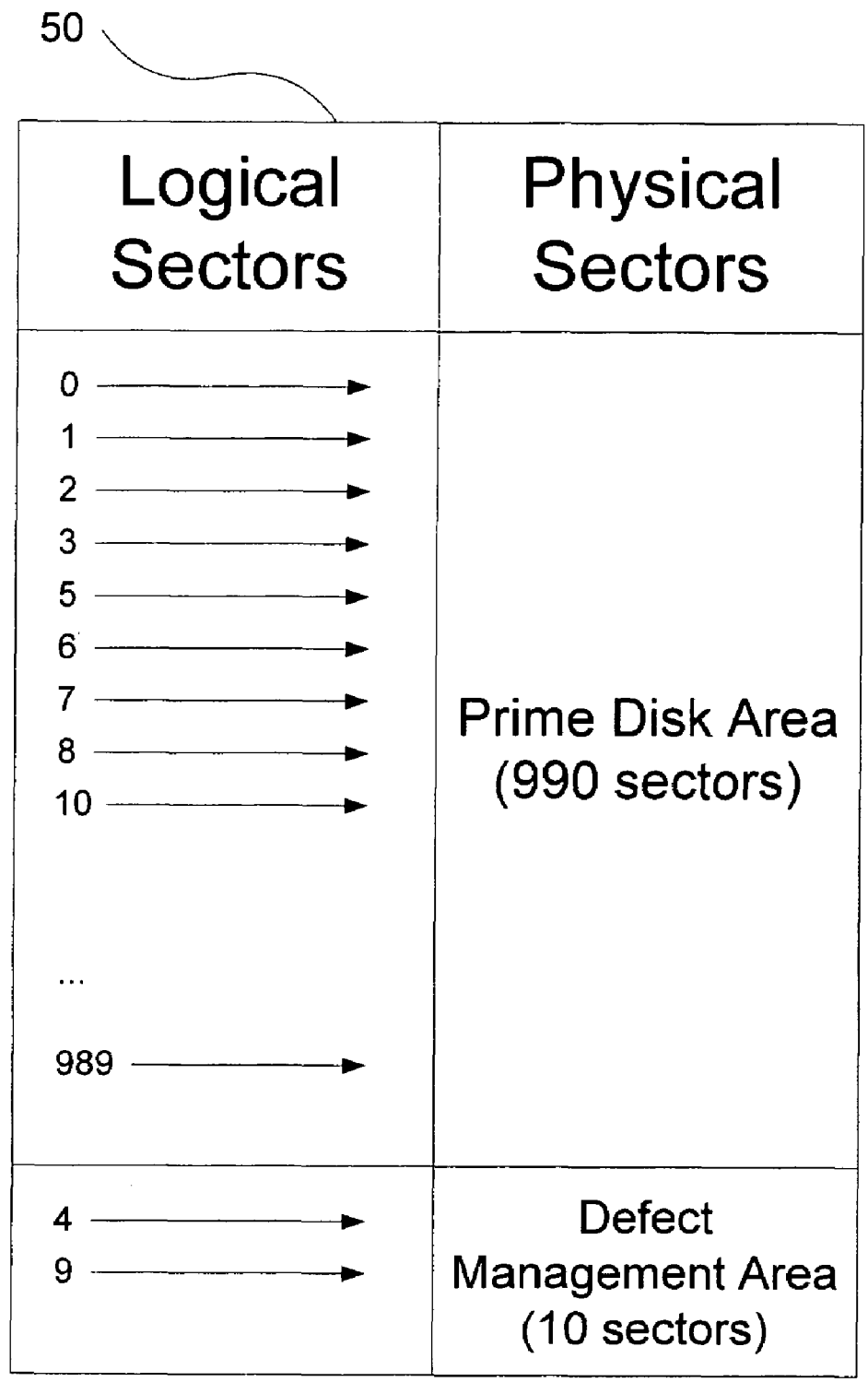
FIG. 3b is a diagram again illustrating the disk layout, however now shown after defective sector relocations have been processed.

By way of example, in accordance with the present invention post-formatting disk usage may manage subsequent defects as shown in FIGS. 3a and 3b. As previously described, FIG. 3a shows disk 50, which has 1000 physical sectors: 990 sectors (numbered 0–989) designated as the PDA and 10 sectors (990–999) designated as the DMA. When post-formatting processing (e.g., a write command) occurs to a set of logical sectors, such as logical sectors 0–10, disk drive 40 first attempts to write to the correspondingly mapped physical sectors in the PDA, as shown in FIG. 3a. If any of the physical sectors of disk 50 mapped to by logical sectors 0–10 are defective or debris is encountered at those sectors, the defect information is stored in RAM 60 for subsequent processing, and disk drive 40 continues writing to the PDA until all of the corresponding physical sectors of disk 50 have been accessed. For example, if during the write command disk drive 40 attempts to access the physical sectors in the PDA that are mapped to logical sectors 0–10, logical sectors 4 and 9 may be identified as defective. If those physical sectors in the PDA are identified as defective, the data storage system 10 stores the appropriate defect information in RAM 60.

Once the write command to sectors 0–10 in the PDA is otherwise completed, disk drive 40 then seeks once to the DMA of disk 50 and processes the relocation of the physical sectors that were identified as defective during execution of the write command. The data storage system 10 processes the relocation of those sectors only after disk drive 40 writes or at least attempts to write to each of the physical sectors in the PDA. In this example, after the standard processing completes the write command, logical sectors 4 and 9 are re-mapped in batch to the DMA based on the defect information in RAM 60; disk drive 40 seeks to the DMA and then writes the logical sector 4 and 9 data to the corresponding physical sectors in the DMA, as shown in FIG. 3b. As the process of the present invention is implemented on disks of increasing density and the number of defective sectors increases, the more the relocation time penalty will be reduced.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A method in a computer system for relocating defective sectors on a formatted disk, comprising:
    performing standard data processing of a predetermined set of logical sectors that are mapped to a first plurality of physical sectors, wherein the first plurality of physical sectors reside in a first area of the formatted disk
    identifying as a defective sector those sectors of the first plurality of physical sectors in which an error is encountered during standard data processing;
    storing defect information in a memory for each of the defective sectors that are mapped to by the plurality of logical sectors;
    continuing standard data processing or the predetermined set of logical sectors;
    upon completion of the standard data processing for the predetermined set of logical sectors performing a seek command to a second area of the formatted disk; and
    performing relocation based on the defect information stored in the memory, wherein the relocation includes re-mapping the plurality of logical sectors, that were mapped to defective sectors, to a second plurality of physical sectors, wherein the second plurality of physical sectors reside in the second area of the formatted disk.

2. The method of claim 1 wherein the standard data processing includes either a read command, a write command, or a verify command.

3. The method of claim 1 wherein the defect information includes logical to physical sector mapping.

4. The method of claim 1 wherein the defect information includes data that the standard data processing attempted to write in one of the defective sectors.

5. The method of claim 1 wherein the first area of the formatted disk is a prime disk area.

6. The method of claim 1 wherein the second area of the formatted disk is a defect management area.

7. A method in a computer system for relocating defective sectors on a formatted disk, comprising:
    performing standard data processing in a first area of the formatted disk, wherein the first area of the formatted disk includes a first plurality of physical sectors;
    identifying defective sectors in the first area while performing the standard data processing and storing defect information in a memory noting the sectors that are identified as defective; and
    upon completion of performing standard data processing and storing of defect information, performing relocation of the physical sectors that are identified as defective to a second area of the formatted disk and performing standard data processing in the second area, wherein the second area of the formatted disk includes a second plurality of physical sectors, and wherein the relocation performed is based on the defect information stored in the memory.

8. The method of claim 7 wherein the standard data processing includes a read command, a write command, or a verify command.

9. The method of claim 7 wherein the defect information includes an address of a logical sector that is mapped to one of the first plurality of physical sectors that is identified as defective.

10. The method of claim 7 wherein the defect information includes data that the standard data processing attempted to write or verify in one of the first plurality of physical sectors that is identified as defective.

11. The method of claim 7 wherein performing relocation includes dynamic sector relocation.

12. The method of claim 7 wherein performing relocation includes re-mapping a logical sector from one of the first plurality of physical sectors that is identified as defective to one of the second plurality of physical sectors.

13. The method of claim 7 wherein performing relocation includes re-mapping the plurality of logical sectors from the plurality of the first physical sectors that are identified as defective to the second plurality of physical sectors.

14. The method of claim 7 wherein the first area of the formatted disk is a prime disk area.

15. The method of claim 7 wherein the second area of the formatted disk is a defect management area.

16. The method of claim 7 wherein performing relocation includes calling a single seek-process.

17. The method of claim 16 wherein the single seek-process is directed to the second area of the formatted disk.

18. The method of claim 7 wherein a time penalty required for performing relocation is substantially a constant time.

19. A method in a computer system for writing information on a formatted disk and dealing with bad sectors discovered on the formatted disk, comprising:
    writing data to a first area of the formatted disk;
    during the process of writing data, identifying any defective sectors of the first area that exist and storing defect information in a memory related to the identified defective sectors for subsequent relocation; and
    relocating the plurality of defective sectors based on the defect information to a second area of the formatted disk upon completion of data writing processing, including writing data to the second area that was intended to be written to the identified defective sectors.

20. The method for relocating bad sectors on a formatted disk of claim 19 wherein the defect Information includes logical to physical sector mapping.

21. The method for relocating bad sectors on a formatted disk of claim 19 wherein the second area of the formatted disk is a defect management area.

22. The method for relocating bad sectors on a formatted disk of claim 19 wherein relocating the bad sectors includes calling a single seek-process.

23. The method for relocating bad sectors on a formatted disk of claim 22 wherein the single seek-process is directed to the second area of the formatted disk.

24. The method for relocating bad sectors on a formatted disk of claim 19 wherein a time penalty required for relocating the bad sectors is substantially a constant time.

25. A method in a data storage system for responding to a request from a host computer for data processing and managing defective sectors on a data storage medium, comprising:
    performing the data processing tasks as requested by the host computer in a first area of the storage media and, while performing data processing, identifying defect sectors so that defect information can be stored, in memory including the related data processing task being attempted when the defective sector of the media is encountered; and
    relocating the stored data processing task to a second area of the storage media after completion of the data processing tasks in the first area.

26. The method of claim 25 wherein the data processing tasks including writing of data to the storage media.

27. The method of claim 25 wherein the data processing tasks including reading of data from the storage media.

28. The method of claim 25 wherein the data processing tasks including verifying of data to the storage media.

29. The method of claim 25 wherein relocating the stored data processing task includes re-mapping a logical sector of the data storage system from the first area to the second area.

30. The method of claim 25 wherein relocating the stored data processing task includes re-mapping a plurality of logical sectors of the data storage system from the first area to the second area.

31. The method of claim 25 wherein the first area is a prime disk area.

32. The method of claim 25 wherein the second area is a defect management area.

33. The method of claim 25 wherein relocating the stored data processing task includes calling a single seek-process.

34. The method of claim 33 wherein the single seek-process is directed to the second area.

35. The method of claim 25 wherein a time penalty required for relocating the stored data processing task is substantially a constant time.

* * * * *

UNITED STATES PATENT AND TRADEMARK OFFICE
CERTIFICATE OF CORRECTION

| | |
|---|---|
| PATENT NO. | : 7,200,771 B2 |
| APPLICATION NO. | : 10/712627 |
| DATED | : April 3, 2007 |
| INVENTOR(S) | : David A. Bolt et al. |

It is certified that error appears in the above-identified patent and that said Letters Patent is hereby corrected as shown below:

Title Page
Item (22) Filed: delete "Nov. 12, 2003" and insert --Nov. 13, 2003--

Signed and Sealed this

Thirty-first Day of July, 2007

JON W. DUDAS
*Director of the United States Patent and Trademark Office*